(12) United States Patent
Coburn et al.

(10) Patent No.: US 11,288,902 B2
(45) Date of Patent: Mar. 29, 2022

(54) EXTERIOR LIGHT AND CHARGE INDICATOR

(71) Applicant: Rivian IP Holdings, LLC, Irvine, CA (US)

(72) Inventors: Matthew Coburn, Milford, MI (US); Brian Gase, Ypsilanti, MI (US); Mohamad Jeffery Hammoud, Bloomfield Hills, MI (US); Luke James Mack, Newport Beach, CA (US); Paul Hoste, White Lake, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 16/459,328

(22) Filed: Jul. 1, 2019

(65) Prior Publication Data

US 2020/0005564 A1    Jan. 2, 2020

Related U.S. Application Data

(60) Provisional application No. 62/692,560, filed on Jun. 29, 2018.

(51) Int. Cl.
   *H04N 7/18*     (2006.01)
   *G07C 5/08*     (2006.01)
   (Continued)

(52) U.S. Cl.
   CPC ............ *G07C 5/0825* (2013.01); *B60L 58/12* (2019.02); *B60Q 1/50* (2013.01); *H05B 45/10* (2020.01);
   (Continued)

(58) Field of Classification Search
   CPC .......... G01D 7/005; F21S 43/14; F21S 43/26; G01R 31/3646; B60L 58/12; B60Q 1/2665; B60Q 1/34; F21Y 2115/10
   See application file for complete search history.

(56) References Cited

U.S. PATENT DOCUMENTS

| 2012/0025765 A1* | 2/2012 | Frey ..................... B60L 3/0069 320/109 |
| 2014/0028440 A1* | 1/2014 | Takeuchi ................ E05F 15/73 340/5.61 |

(Continued)

FOREIGN PATENT DOCUMENTS

| DE | 10 2014 222 695 | 10/2015 |
| EP | 2 848 448 | 3/2015 |

OTHER PUBLICATIONS https://www.youtube.com/watch?v=-asRDGMJaQU (Year: 2014).*
International Search Report and Written Opinion in PCT/US2019/040193 dated Oct. 17, 2019.

*Primary Examiner* — Munear T Akki
(74) *Attorney, Agent, or Firm* — Haley Guiliano LLP

(57) ABSTRACT

Electric vehicles indicate charge levels in different ways. A lighting control module is communicatively is configured to illuminate an exterior light of an electric vehicle to indicate a charge status of a battery for the electric vehicle. The charge status is indicated based on varying an intensity of the exterior light, based on illuminating a subset of the exterior lights, and/or based on an animation. The display of the charge indicator varies based on a location of the vehicle, the presence of a person in proximity to the vehicle, and/or a charger connected to the vehicle.

20 Claims, 7 Drawing Sheets

(51) Int. Cl.
*B60L 58/12* (2019.01)
*H05B 45/20* (2020.01)
*H05B 47/19* (2020.01)
*H05B 45/10* (2020.01)
*H05B 47/105* (2020.01)
*B60Q 1/50* (2006.01)

(52) U.S. Cl.
CPC ........... *H05B 45/20* (2020.01); *H05B 47/105* (2020.01); *H05B 47/19* (2020.01); *B60Q 2400/20* (2013.01); *B60Y 2200/91* (2013.01)

(56) References Cited

U.S. PATENT DOCUMENTS

| | | | |
|---|---|---|---|
| 2014/0253306 A1* | 9/2014 | Gillespey | B60Q 1/00 340/425.5 |
| 2018/0065544 A1* | 3/2018 | Brusco | B60L 1/14 |
| 2019/0232795 A1* | 8/2019 | Zendler | B60K 35/00 |

* cited by examiner

EXTERIOR LIGHT AND CHARGE INDICATOR

CROSS REFERENCE TO RELATED APPLICATIONS

This application claims the benefit of U.S. Provisional Application No. 62/692,560, filed Jun. 29, 2018, the disclosure of which is hereby incorporated by reference in its entirety.

INTRODUCTION

Electric vehicles require charging. Electric vehicles indicate charge levels in different ways. For example, some use a small light near the windshield or an indication on the dashboard. Others use a charge indicator at the charging port. The way charge indicators are used can be confusing to someone unfamiliar with a particular electric vehicle model. For example, when a vehicle is charging at a public charging station, it can be difficult to determine if the vehicle is fully charged and can be disconnected to begin charging another electric vehicle. It is also difficult to determine the charging status of a vehicle a short distance away from the vehicle.

It would be advantageous to provide a user with an easy way to read a charge indicator of an electric vehicle. It would also be advantageous to provide a charge indicator that is visible a short or longer distance away from an electric vehicle. It would also be advantageous to utilize existing exterior lighting or lighting areas to provide a charge indicator.

SUMMARY

In some embodiments, a charge indicator system is provided for an electric vehicle. The charge indicator system comprises an exterior light, such as a running light, a battery management module, and a lighting control module. The lighting control module is communicatively coupled to the battery management module and is configured to cause the exterior light to emit light during driving operation of the electric vehicle. The lighting control module is also configured to receive charge status information of a vehicle battery from the battery management module and cause the exterior light to emit light that indicates charge status based on the received charge status information. In some embodiments, the running light is a daytime running light or a front or rear position light.

In some embodiments, the lighting control module is configured to cause the exterior light to emit light at a substantially constant intensity during driving operation of the electric vehicle and emit light at a varying intensity during charging. In some embodiments, the lighting control module is configured to cause the exterior light to emit light at a rapidly varying intensity when the charge status information indicates a charging fault has occurred. In some embodiments, the light emitted during driving operation and during charging is the same color.

In some embodiments, the exterior light comprises a width and a height, where the width is at least five times greater than the height. In some embodiments, the exterior light comprises a first set of light emitting diodes (LEDs) for emitting light during driving operation of the electric vehicle and a second set of LEDs for emitting light that indicates the charge status. In some embodiments, the lighting control module is configured to cause a first subset of the second set of LEDs to emit light to indicate a first charge status and cause a second subset of the second set of LEDs to emit light to indicate a second charge status.

In some embodiments, the lighting control module is configured to cause the exterior light to emit light of a first color (e.g., white) during driving operation of the electric vehicle and emit light of a second color during charging, where the first color is different than the second color (e.g., blue). In some embodiments, the lighting control module is configured to cause the exterior light to emit light of a third color (e.g., green) when the vehicle battery is fully charged. In some embodiments, the lighting control module is configured to cause the exterior light to emit light of a fourth color (e.g., red) when there is a charging fault.

In some embodiments, the charge indicator system further comprises a proximity sensor configured to detect the presence of a person. In such embodiments, the lighting control module is configured to receive a signal from the proximity sensor indicating the presence of a person and cause the exterior light to emit light that indicates charge status responsive to the signal indicating the presence of a person. In some embodiments, the proximity sensor comprises a motion sensor configured to detect motion and the signal indicating the presence of a person comprises a signal indicating the presence of motion. In some embodiments, the proximity sensor comprises one of a near-field communication device and a Bluetooth communication device.

In some embodiments, the charge indicator system further comprises a positioning device configured to determine a location of the electric vehicle. In such embodiments, the lighting control module is configured to receive a signal from the positioning device indicating the location of the electric vehicle and cause the exterior light to emit light that indicates charge status responsive to the location of the electric vehicle. For example, the lighting control module may be configured to cause the exterior light to not emit light that indicates charge status when both the electric vehicle is charging and the location of the electric vehicle is within a threshold distance (e.g., 50 feet) of a tagged location (e.g., a tagged location of a user's home). As another example, the lighting control module may be configured to cause the exterior light to emit light that indicates charge status when the location of the electric vehicle is not within a threshold distance of the tagged location (e.g., when the vehicle is located at a public charger that is more than 50 feet away from the tagged location of the user's home).

In some embodiments, a method for indicating charge status of an electric vehicle is provided. The method comprises emitting light of a substantially constant light intensity, using an exterior light, during driving operation of the electric vehicle (e.g., when the electric vehicle is turned on and ready to drive, and/or is moving in a forward or reverse direction). The method further comprises receiving charge status information of a vehicle battery from a battery management module and emitting light, using the exterior light, that indicates charge status of the based on the received charge status information.

In some embodiments, the exterior light comprises a downward illuminating light source. In such embodiments, the downward illuminating light source may illuminate a reflective surface within the exterior light. The reflective surface may be configured to reflect light from the downward illuminating light source to an exterior lens. In some embodiments, a texture of the reflective surface is selected based on a desired light scattering and reflection of incident light from the downward illuminating light source. In some embodiments, the exterior lens is integrated with and adjacent to another exterior light (e.g., below a taillight lens).

In some embodiments, the charge indicator system is configured to cause the exterior light to display an animation in response to detecting that the vehicle is either being charged by, or is charging, another vehicle. For example, the charge indicator system may cause the exterior light to display an outward moving animation in response to detecting that the vehicle is charging another vehicle (e.g., via vehicle to vehicle charging). As another example, the charge indicator system may cause the exterior light to display an inward moving animation in response to detecting that the vehicle is receiving a charge from another vehicle.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

DETAILED DESCRIPTION

Vehicles commonly include different types of exterior lighting, such has headlights, taillights, fog lights, turn signal lights, position lights, and daytime running lights. Each type of light is used for a particular purpose during operation of vehicles. Typically, when a vehicle is turned off, the exterior lights are also turned off either immediately or after a short period of time. Also, when an electric vehicle is charging, the vehicle is usually in a lower power state or turned off with the exterior lights also turned off.

In accordance with the present disclosure, one or more exterior vehicle lights are used to indicate the charging status of an electric vehicle. The exterior lights therefore can be used for multiple purposes. In some embodiments, an exterior light (e.g., a daytime running light or a position light) is used to indicate the charging status, for example, when the vehicle is connected to a charger. In some embodiments, a taillight (e.g., a tailgate light bar) is used to indicate the charging status. Accordingly, an exterior light can be used for different purposes based on the state of the vehicle. The same light source or sources within the exterior light or different lights sources (e.g., of different colors) can be used depending on whether the vehicle is being operated (e.g., in a driving mode), connected to a charger, or is providing power to another entity (e.g., when providing power to the grid or another vehicle). Thus, the charge indicator system of the present disclosure provides a convenient way to indicate the charge status of an electric vehicle.

Figure 1:
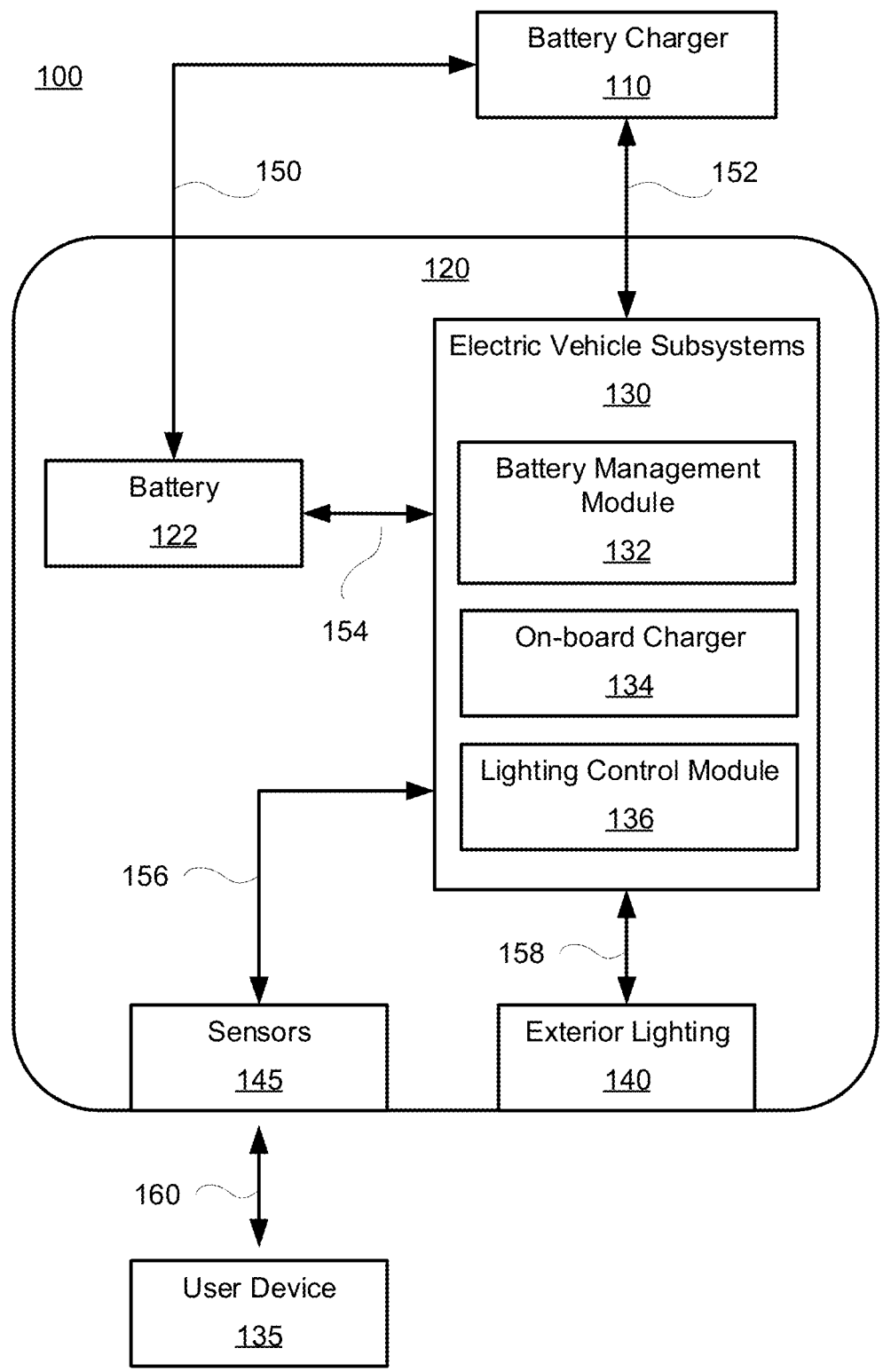
FIG. 1 shows a system diagram of a charging arrangement, including an illustrative battery charger and an illustrative electric vehicle, in accordance with some embodiments of the present disclosure.

FIG. 1 shows a system diagram of a charging arrangement 100, including illustrative battery charger 110 and illustrative electric vehicle 120, in accordance with some embodiments of the present disclosure. Electric vehicle 120 includes a battery 122, which may include one or more battery modules, electric vehicle subsystems 130, sensors 145, and exterior lighting 140. Electrical vehicle subsystems 130 includes, for example, battery management module 132, on-board charger (OBC) 134, lighting control module 136, and any suitable additional or corresponding equipment.

In some embodiments, battery management module 132 and on-board charger 134 may be combined. For example, battery management module 132 may be included in on-board charger 134. In some embodiments, battery management module 132 and on-board charger 134 may be partially, or wholly, implemented as separate systems, which may communicate with each other. For example, on-board charger 134 may include connectors for interfacing with a battery charger, and battery management module 132 may connect charging terminals from on-board charger 134 to battery 122 via one or more controllable switches. In a further example, battery management module 132 may include a software package, implemented on processing equipment of on-board charger 134, which may include charging hardware (e.g., connections, switches, and sensors).

In some embodiments, battery management module 132 may be configured to manage charging of battery 122, which may include measuring one or more battery characteristics of battery 122, identifying if a fault has occurred, providing power to one or more of electric vehicle subsystems 130 (e.g., lighting control module 136), communicating with battery charger 110, any other suitable actions, or any combination thereof. Battery management module 132 may be coupled to battery 122 via coupling 154. Battery management module 132 may include, for example, electrical components (e.g., switches, bus bars, resistors, capacitors), control circuitry (e.g., for controlling suitable electrical components), and measurement equipment (e.g., to measure voltage, current, impedance, frequency, temperature, or another parameter). Battery management module 132 may provide charge status information to lighting control module 136. Charge status information includes, for example, charge level, whether the battery is being charged, charging current, charging voltage, charging mode, and whether a charging fault exists.

In some embodiments, electric vehicle 120 may be plugged, or otherwise connected to, battery charger 110 via couplings 150 and 152. For example, a single cable (e.g., having a SAE J1772 charging plug), having more than one conductor of suitable gauge, may be used to couple battery charger 110 to electric vehicle 120. The single cable may include conductors for carrying charging current (e.g., coupling 150) and conductors for transmitting information (e.g., coupling 152). It will be understood that any suitable arrangement of leads may be used in accordance with the present disclosure. For example, in some embodiments, coupling 152 may include both charging leads and information leads, and arrangement 100 need not include coupling 150.

Battery charger 110 may be coupled to a power source, such as a power transmission grid, a solar panel, a generator, a wind turbine, or another vehicle, and may be configured to provide charging current at a suitable charging voltage to battery 122 of electric vehicle 120. Battery charger 110 may be, for example, a fixed charging station (e.g., a charging station installed in a public location or in a user's home), a portable charger (e.g., a charger connected to a portable generator, a portable solar panel, or another vehicle). In some embodiments, battery charger 110 may be capable of charging a battery (e.g., battery 122) at one or more voltages, with one or more current limitations. For example, battery charger 110 may receive information from electric vehicle subsystems 130 (e.g., on-board charger 134 via coupling 152) describing what voltage, current, or both, electric vehicle 120 may be charged with. Battery charger 110 may provide a charging current that is limited by one or more constraints. For example, electric vehicle 120 may communicate to battery charger 110 what charging current is desired for charging. In a further example, a cable type (e.g., coupling 150) may have a maximum associated current capacity based on insulation and heat transfer considerations. In some embodiments, battery charger 110 and on-board charger 134, support both the inflow and outflow of current from battery 122 via coupling 150. For example, during vehicle to vehicle charging or vehicle to grid power supply, battery charger 110 and/or on-board charger 134 may direct power from battery 122 to a power source coupled to battery charger 110, such as a battery of another vehicle or an electric power grid.

Battery 122 may include bus bars (e.g., for connecting terminals of battery modules, pre-charge circuits or measurements), switches (e.g., contactors for opening and closing battery connections), sensors (e.g., for sensing temperature, voltage, current, impedance, or other parameters), any other suitable components, or any suitable combination thereof.

Sensors 145 include any of one or more sensors. Sensors 145 are coupled to electric vehicle subsystems 130 (e.g., lighting control module 136) via coupling 156 (e.g., a Controller Area Network (CAN) bus). In some embodiments, sensors 145 comprise a positioning device configured to determine a location of electric vehicle 120. For example, the positioning device may be a satellite navigation system receiver such as Global Positioning System (GPS) receiver or a Global Navigation Satellite system (GLONASS) receiver. As another example, the positioning device operate may operate on terrestrial signals, such as cell phone signals, Wi-Fi signals, or ultra-wideband signals. The determined location may be in any suitable form such as a geographic coordinate, a street address, a nearby landmark such as an identification of the nearest charging station or a tagged location associated with the vehicle (e.g., a location of a home of the user stored by electric vehicle subsystems 130). In some embodiments, electric vehicle subsystems 130 uses the determined location to identify whether the vehicle is within a threshold range of a tagged location (e.g., is within a geofence). For example, electric vehicle subsystems 130 may determine whether vehicle 120 is within fifty feet of a tagged home location of the user. Electric vehicle subsystems 130 may determine that vehicle 120 is in a user's home when the determined location is within fifty feet of the tagged home location. In contrast, electric vehicle subsystems 130 may determine that vehicle 120 is not in a user's home when the determined location is not within fifty feet of the tagged home location. In some embodiments, electric vehicle subsystems 130 may utilize the determined location to identify whether battery charger 110 is a home charging station or a non-home charging station (e.g., a public charging station, another vehicle, a generator, etc.). The determined location information and/or an indication of whether the vehicle is within the threshold distance of the tagged location can be transmitted to lighting control module 136.

In some embodiments, sensors 145 comprise one or more proximity sensors configured to detect the presence of a person. The proximity sensor can be one or more of a near-field communication device, a Bluetooth communication device, a motion sensor (e.g., a motion detecting camera or passive infrared detector), an ultrasonic sensor, an electromagnetic sensor, any other suitable proximity sensor, and any suitable combination thereof. In some embodiments, the proximity sensor detects the presence of a person by detecting the presence of user device 135 (e.g., using wireless signal 160). User device 135 can be any suitable user device, such as a cell phone, smart watch, tablet, or key fob. The proximity sensor can transmit data to electric vehicle subsystems 130, including lighting control module 136. The transmitted data can indicate the presence or absence of a person. For example, when the proximity sensor is a motion sensor, the transmitted data can indicate whether motion is present.

Exterior lighting 140 may include one or more of headlights (e.g., low beam and high beam lights), fog lights, taillights, backup lights, turn signal lights, running lights (e.g., daytime running lights and position lights), and any other suitable lights. An exemplary arrangement of exterior lighting 140 is discussed further in relation to FIG. 7. Exterior lighting 140 is controlled by electric vehicle subsystems 130 via coupling 158.

In some embodiments, lighting control module 136 may be configured to control exterior lighting 140. Lighting control module 136 may be a standalone module or may be combined with any other module of electric vehicle subsystems 130. Lighting control module 136 can control exterior lighting 140 based on the current state of the vehicle. For example, lighting control module 136 may receive data indicating that the car is in a running state (e.g., from a motor management module of electric vehicle subsystems 130). Lighting control module 136 may determine, based on the received data (e.g., via a lookup table), a specific exterior light to illuminate, an intensity, a color, a frequency, etc., when the vehicle is in a running or driving state. For example, when the state of the vehicle is in drive, reverse, parked but ready to begin driving, or is currently moving, lighting control module 136 can cause an exterior light (e.g., the daytime running light, the position light, the tail light, etc.) to emit light (e.g., a substantially constant white or red light). As another example, when the state of the vehicle is in a running or driving state of operation and the brake is pressed, lighting control module 136 can cause the taillight to emit red light (e.g., a substantially constant red light at a higher intensity than during the running or driving state of operation).

In some embodiments, lighting control module may control exterior lighting 140 based on a charge state received from battery management module 132. As example, when lighting control module 136 receives charge status information from battery management module 132 indicating that the vehicle is being charged, lighting control module 136 can cause exterior lighting 140 to emit light that indicates the charge status. For example, as discussed further below with respect to FIGS. 2 and 3, if lighting control module 136 receives an indication from battery management module 132 that battery 122 is half-way charged, lighting control module 136 may cause exterior lighting 140 to emit light from 50% of the lighting modules within exterior lighting 140.

Lighting control module 136 can also control exterior lighting 140 responsive to data received from sensors 145. For example, lighting control module 136 can use the received data to determine when to display the charge status using exterior lighting 140. For example, when vehicle 120 is being charged at home (e.g., based determining that the vehicle is within a threshold distance of a tagged location), the charge status information may not be displayed unless a person is in the vicinity of the vehicle. Lighting control module 136 may receive data from sensor 145, such as a positioning sensor, indicating that the car is located within a home. When lighting control module 136 receives data from sensors 145 indicating the presence of a person (e.g., based on detecting the presence of a key fob, detecting motion around the car, detecting a hand waved above a sensor, detecting selection of a button, etc.), lighting control module 136 can cause exterior lighting 140 to emit light that indicates the charge status. In some embodiments control module 136 will cause exterior lighting 140 to cease emitting light that indicates the charge status, after a threshold amount of time (e.g., two minutes) from detecting the presence of a person. In some embodiments, lighting control module 136 may cause exterior lighting 140 to cease emitting light that indicates the charge status upon detecting, based on data from sensors 145, that a person is no longer within the vicinity of the vehicle.

In some embodiments, lighting control module 136 may determine whether to illuminate a front or rear exterior light based on an orientation of the vehicle. For example, when lighting control module determines, based on data from an orientation sensor (e.g., sensor 145), that a vehicle 120 is backed into a parking spot (e.g., the rear of the vehicle is closest to the charger), lighting control module 136 may control the illumination of a rear exterior light (e.g., taillight) to indicate the charge status. In contrast, when the lighting control module determines that vehicle 120 is oriented with a front of the vehicle facing the charger, lighting control module 136 may control the illumination of a front exterior light (e.g., parking light) to indicate the charge status. In some embodiments, lighting control module 136 may control both the front exterior light and the rear exterior light to indicate the charge status.

As another example, when vehicle 120 is being charged more than a threshold distance away from a tagged location (e.g., when the vehicle is being charged more than 50 feet away from the user's home), the charge status information may be displayed during the entire time vehicle 120 is charging. In some embodiments, the positioning data is received from charger 110 (e.g., via coupling 153). When lighting control module 136 receives an indication from on-board charger 134 or battery charger 110 that vehicle 120 is disconnected from the battery charger, lighting control module 136 can cause exterior lighting 140 to cease emitting light indicating the charge status.

In some embodiments, the displayed charge status varies based on a detected charger type or charging location. For example, electric vehicle subsystems 130 may determine that vehicle 120 is being charged at a non-home location, such as a public charger, based on the positioning data. In response to determining that vehicle 120 is being charged at a public charger, lighting control module 136 may control exterior lighting 140 to display a charge status, such as a charge percentage of battery 122. In contrast, when electric vehicle subsystems 130 determines that battery charger 110 is associated with another vehicle (e.g., based on receiving data via coupling 152 or using wireless communications such as a dedicate short range communication channel, Wi-Fi, Bluetooth, etc.), lighting control module 136 may control exterior lighting 140 to display an animation indicating whether vehicle 120 is charging or getting charged by the other vehicle (discussed further with respect to FIG. 9 and FIG. 10).

At least some of electric vehicle subsystems 130 may operate, or otherwise draw power (e.g., lighting control module 136, exterior lighting 140, and sensors 145) while the vehicle is in a charging configuration. Battery management module 132 may be configured to manage providing power to subsystems of electric vehicle systems 130, while battery charger 110 is connected (e.g., via couplings 150 and 152) and providing charging current at a suitable voltage.

The battery management module and lighting control module may be implemented in hardware, software, or a combination thereof. The battery management module and lighting control module may be standalone modules, modules distributed among processing equipment, module integrated into an existing electric vehicle system, or be a combination thereof.

Figure 2:
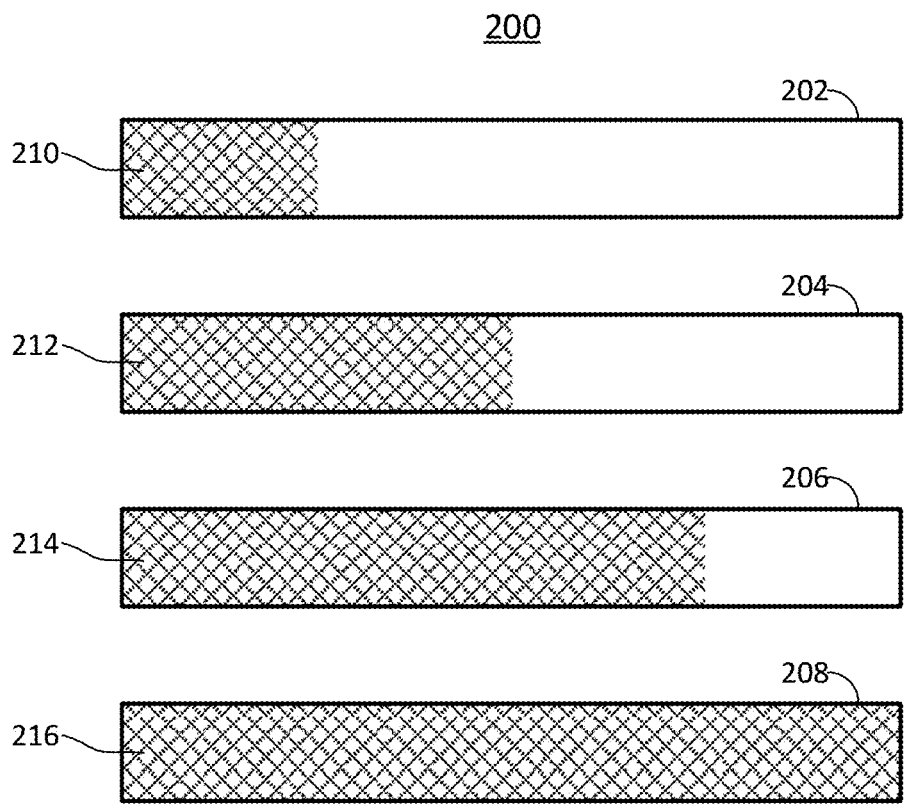
FIG. 2 shows four illustrative views of a rectangular exterior light of an electric vehicle indicating charge status in accordance with some embodiments of the present disclosure.

FIG. 2 shows charge status views 200 depicting four illustrative views of a rectangular exterior light of an electric vehicle indicating charge status in accordance with some embodiments of the present disclosure. The exterior light (e.g., one of exterior lighting 140 of FIG. 1) may be any suitable exterior light such as a daytime running light or a position light (e.g., center lamp 706 of FIG. 7). In some embodiments, the daytime running light or position light is shaped like a bar that is positioned on the front bumper area of the vehicle (discussed further with respect to FIG. 7). The bar can extend between the headlights. In some embodiments, the width of the daytime running light is at least 3, 4, 5, 6, 7 or more times greater than its height.

In some embodiments, the exterior light comprises a first set of light emitting diodes (LEDs) for emitting light during driving operation of the electric vehicle and a second set of LEDs for emitting light that indicates the charge status. Each of the four views (e.g., views 202, 204, 206, and 208) shows a different illumination pattern of the exterior light depicted as various shaded regions (e.g., shaded regions 210, 212, 214, and 216). In view 202, the left twenty-five percent of the exterior light is emitting light, depicted as shaded region 210. In view 204, the left fifty percent of the exterior light is emitting light, depicted as shaded region 212. In view 206, the left seventy-five percent of the exterior light is emitting light, depicted as shaded region 214. In view 206, the entire exterior light is emitting light, depicted as shaded region 216. Each view indicates a different charge level of the battery. For example, when lighting control module receives, from battery management module 132, an indication that battery 122 is charged twenty-five percent, battery management module may instruct exterior lighting 140 to illuminate twenty-five percent of the daytime running light (as depicted by shaded region 210 in view 202).

In some embodiments, the percentage of the exterior light that is emitting light corresponds to the battery charge level percentage. In other words, the illuminated portion of the exterior light increases as the charge level increases. For example, the exterior light may include multiple LEDs and as the charge level increases, additional LEDs are turned on to emit light (e.g., under the control of lighting control module 136 of FIG. 1). For example, lighting control module 136 may identify a subset of LEDs within an array of LEDs of the daytime running light or position light (e.g., the leftmost twenty-five percent of LEDs in the array) corresponding to the charge level (e.g., twenty five percent). Lighting control module 136 may transmit, via coupling 158 (e.g., a Controller Area Network (CAN) bus), an indication of the subset to an LED driver of exterior lighting 140. In response to receiving the indication of the subset, exterior lighting 140 may illuminate the leftmost twenty-five percent of the LEDs in the array. The color of emitted light can be the same or different than the color of emitted light during driving operation of the vehicle.

When the exterior light of FIG. 2 is an exterior light (e.g., a daytime running light or a position light), the color of emitted light may be white during driving operation of the vehicle. The color of emitted light may be different when the exterior light is indicating the charge status. In some embodiments, the color is blue when the light is indicating the charge level, green when fully charged, and red when there is a charge problem. This provides an easy to read charge indicator. It is visible a short distance or longer distance away from the electric vehicle. For example, while a vehicle is being charged at a rest stop on a highway, an owner of the vehicle can easily see the charge level of his or her car from inside of the rest stop.

Although the embodiment of FIG. 2 is described with respect to increasing the size of the illuminated portion of the exterior light from left to right as a charge level of the battery increases, the size of the illuminated portion may begin at, and increase in any direction. For example, the size of the illuminated portion may increase from bottom to top of the exterior light, right to left, top to bottom, center out, etc.

Figure 3:
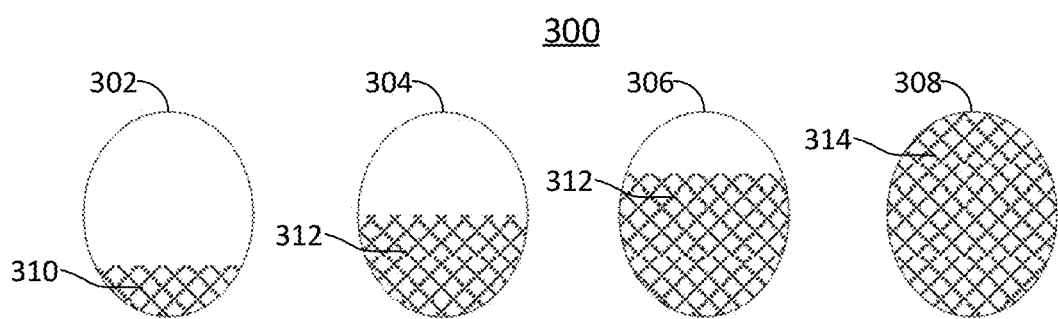
FIG. 3 shows four illustrative views of an oval exterior light of an electric vehicle indicating charge status in accordance with some embodiments of the present disclosure.

FIG. 3 shows charge status views 300 depicting four illustrative views (e.g., view 302, 304, 306, and 308) of an oval exterior light of an electric vehicle indicating charge status in accordance with some embodiments of the present disclosure. The exterior light may be any suitable exterior light such as a headlight or a daytime running light (e.g., front lamps 704 and 708 of FIG. 7). Each of the four views (e.g., views 302, 304, 306, and 308) shows a different illumination pattern of the exterior light depicted as various shaded regions (e.g., shaded regions 310, 312, 314, and 316). In view 302, the bottom twenty-five percent of the exterior light is emitting light, depicted as shaded region 310. In view 304, the bottom fifty percent of the exterior light is emitting light, depicted as shaded region 312. In view 306, the bottom seventy-five percent of the exterior light is emitting light, depicted as shaded region 314. In view 306, the entire exterior light is emitting light, depicted as shaded region 316. In some embodiments, the exterior light of FIG. 3 may operate similar to the exterior light of FIG. 2 to indicate the charge status, with the only difference being its shape.

Although the embodiment of FIG. 2 is described with respect to increasing the size of the illuminated portion of the exterior light from bottom to top as a charge level of the battery increases, the size of the illuminated portion may begin at, and increase in any direction. Although the edge of the illuminated portion is shown as a straight line in both FIG. 2 and FIG. 3, the edge of the portion may be any design or configuration so long as it indicates a percentage charge of the battery. For example, as discussed below with respect to FIG. 11, the edge of the illuminated portion may progressively increase and decrease in intensity. While the illumination patterns are depicted as continuous regions, the illumination patterns need not be continuous. For example, the exterior light may contain a plurality of discrete segments (e.g., 50 that can be independently illuminated. Lighting control module 136 may instruct the leftmost twenty-five segments to illuminate in response to determining that the battery is halfway charged.

While FIG. 2 and FIG. 3 are discussed in relation to a daytime running light, position light, and headlight, respectively, it would be understood that exterior lights can be any light such as a parking/position light, taillight, reverse light, turn signal, and/or standalone lighting enclosure and/or a combination of any such lights.

Figure 4:
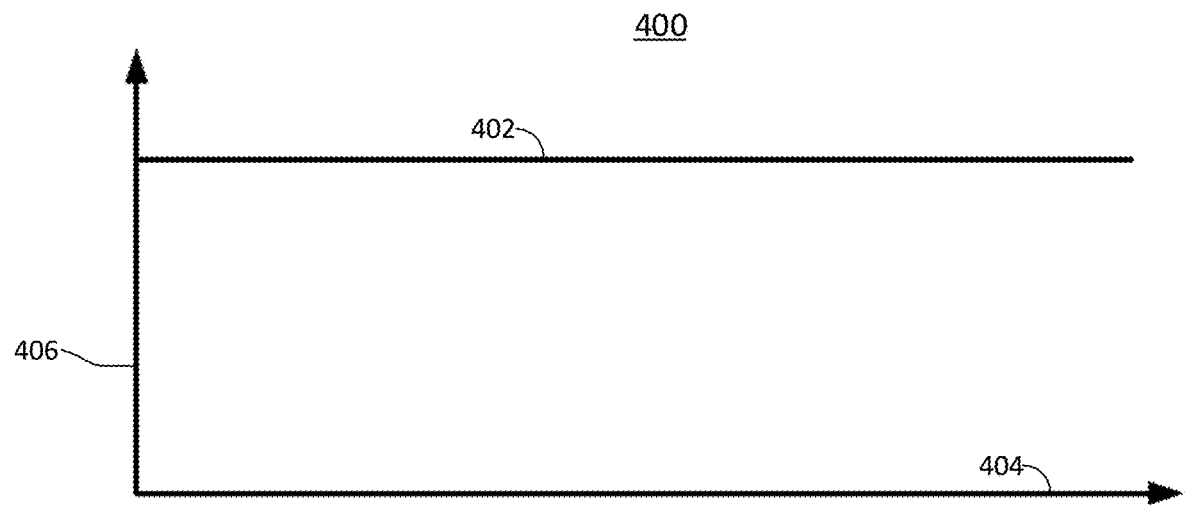
FIG. 4 shows a plot of an illustrative light intensity signal in accordance with some embodiments of the present disclosure.

It will be understood that the shapes of the exterior lights shown in FIGS. 2 and 3 are merely illustrative and that any suitably shaped exterior light can be used to indicate charge status (e.g., a square, triangle, halo, etc.). For example, while the exterior light is depicted as a rectangle in FIG. 2 and as a circle in FIG. 3, the shape and illumination pattern can vary without departing from the scope of the present disclosure. For example, the exterior light may comprise a plurality of light sources, such as a light source for a stop lamp, a light source for a turn signal, a light source for a back-up light, etc. Each of the light sources may illuminate a same or a different portion of a single exterior light. For example, a top portion of the exterior light may be used for the rear position marker and stop signal, while a bottom portion of the exterior light may be used for a reverse light and a charge status indicator. In such embodiments where multiple light marking/signaling/charging functions share a single lens (e.g., a combination stop, rear marking, and charging indicator light), different colors or intensities may be used to distinguish between position marking, signaling, or charging functions FIG. 4 shows a plot 400 of an illustrative light intensity signal (signal 402) in accordance with some embodiments of the present disclosure. Abscissa 404 of plot 402 is in units of time and ordinate 406 of plot 402 is in units of light intensity. As shown, the light intensity is substantially constant. It will be understood that a substantially constant light intensity signal includes a signal having minor variations due to changes in the temperature of a light emitter and due to minor system fluctuations in the signal applied to a light emitter. It will also be understood that an emitter driven by an alternating current or a pulsed signal (e.g., a PDM signal) such that the emitted light intensity appears to be constant to a person may also be considered to produce a substantially constant light intensity signal. In some embodiments, the light intensity signal of the plot corresponds to the light intensity of an exterior vehicle light (e.g., exterior lighting 140). For example, the light intensity signal may correspond to the light emitted by a daytime running light during driving operation of electric vehicle 120.

Figure 5:
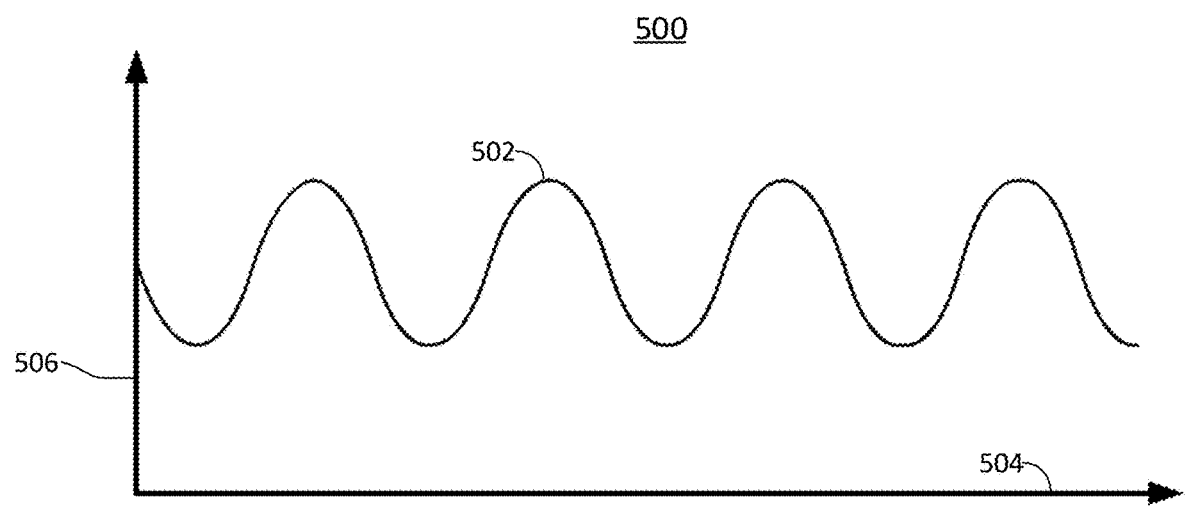
FIG. 5 shows a plot of an illustrative light intensity signal that varies at a first frequency in accordance with some embodiments of the present disclosure.

FIG. 5 shows a plot 500 of an illustrative light intensity signal (signal 502) that varies at a first frequency in accordance with some embodiments of the present disclosure. Abscissa 504 of plot 500 is in units of time and ordinate 506 of plot 500 is in units of light intensity.

Figure 6:
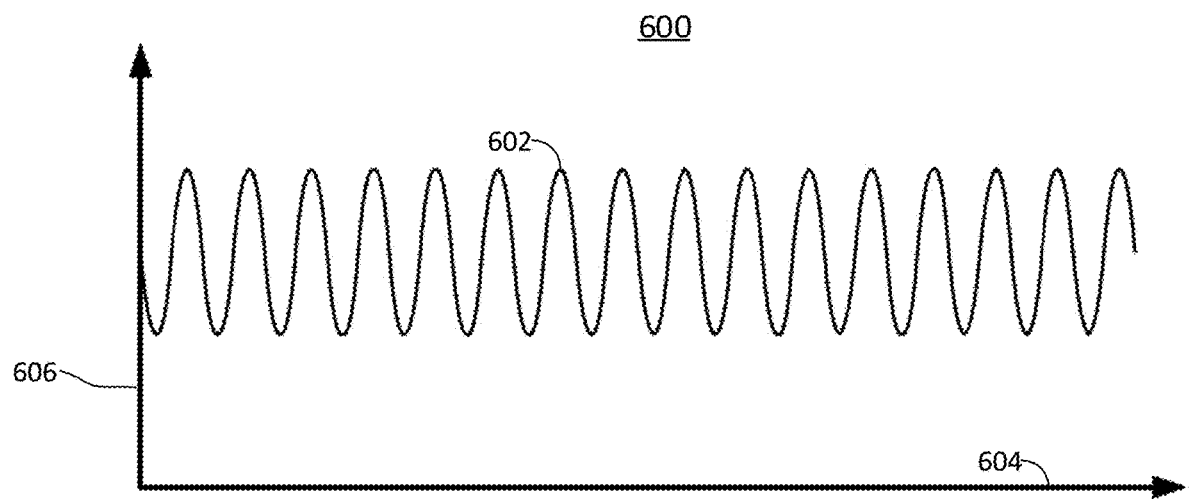
FIG. 6 shows a plot of an illustrative light intensity signal that varies at a second frequency in accordance with some embodiments of the present disclosure.

FIG. 6 shows a plot 600 of an illustrative light intensity signal (signal 602) that varies at a second frequency in accordance with some embodiments of the present disclosure. Abscissa 604 of plot 600 is in units of time and ordinate 606 of plot 600 is in units of light intensity. In some embodiments, light intensity signals 502 and 602 correspond to the light intensity of an exterior vehicle light (e.g., exterior light 140) at different points in times. For example, the light intensity signals may correspond to the light emitted by a daytime running light of an electric vehicle when the vehicle is connected to a battery charger. The light intensity signals can be used to indicate the charging status of the electric vehicle battery. In some embodiments, the relatively slowly varying light intensity signal 502 of FIG. 5 (e.g., at a period of between 1-5 seconds) can be used to indicate that the battery is charging and the relatively faster varying (e.g., rapidly varying) light intensity signal 602 of FIG. 6 (e.g., at a period less than 1 second) can be used to indicate that there is a charging fault.

As an example, lighting control module 136 may vary the intensity of the light emitted by exterior lighting 140 by controlling a duty cycle of a Pulse Width Modulation (PWM) signal based on signal 502 or signal 602. For example, when signal 502 or signal 602 is near a local minima, the duty cycle of the PWM signal may be low (e.g., <20%), when signal 502 or signal 602 is near a local maximum, the duty cycle of the PWM signal may be high (e.g., >80%). Accordingly, different charging statuses can be indicated by using light intensity signals having different characteristics. This enables a single exterior light to be used for multiple purposes, even when the exterior light is only capable of emitting light of a single color. As another example, light intensity signal 402 of FIG. 4 can be used when the battery is fully charged.

It will be understood that the light intensity signals of FIGS. 4-6 are merely illustrative and that any suitable light intensity signals may be used to convey information. For example, sawtooth or square waveforms can be used in place of the sinusoidal waveforms of FIGS. 5 and 6. In addition, multiple waveforms or waveforms of varying frequency can be used. For example, a long pulse followed by a short pulse may be used to indicate that the battery is fully charged. As another example, the frequency of variation can be used to indicate the charge level of the battery. For example, the frequency can increase as the battery level increases. As another example, the amplitude of variation or the DC level can increase as the battery level increases. In another example, a maximum and minimum intensity of signals 402, 502, and 602 may be selected based on a detected amount of ambient light. For example, the maximum intensity may be higher when a light sensor (e.g., one of sensors 145) detects a high level of ambient light, but may be lower when the light sensor detects a lower level of ambient light.

It will be understood that the light intensity signals of FIGS. 4-6 can be used with any suitable exterior light or lights of a vehicle. For example, the light intensity signals can be provided to both the daytime running light in the front of the vehicle and a light in the rear of the vehicle (e.g., a backup light or a taillight). It will also be understood that the light intensity signals of FIGS. 4-6 can be used to emit any suitable color or colors of light. In some embodiments, the light intensity signals of FIGS. 4-6 are used in conjunction with the charge status views of FIGS. 2 and 3.

Figure 7:
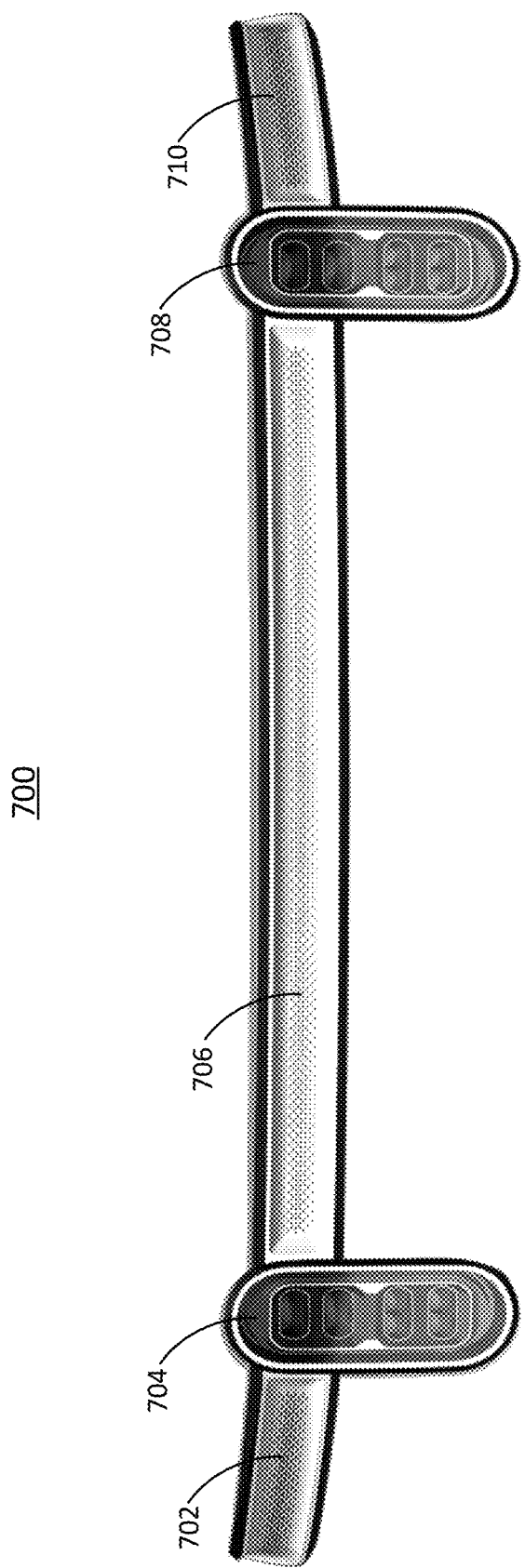
FIG. 7 depicts an illustrative arrangement of an exterior light of an electric vehicle in accordance with some embodiments of the present disclosure.

FIG. 7 depicts an illustrative arrangement of an exterior light of an electric vehicle (e.g., exterior lighting 140) in accordance with some embodiments of the present disclosure. For example, exterior light 700 may comprise multiple lights, such as side lamps 702 and 710, front lamps 704 and 708, and center lamp 706. Each of lamps 702, 704, 706, 708, and 710 may comprise one or more light sources, such as one or more LEDs. In such embodiments having more than one light source, the light sources may be arranged in an array spanning at least one dimension of the light. Each light source may be independently controllable by lighting control module 136.

In some embodiments, center lamp 706 and/or front lamps 704 and 708 may be configured to indicate a charge status of battery 122. As discussed in relation to FIGS. 2 and 3, lighting control module 136 may vary an illuminated portion of center lamp 706 and/or front lamp 704 and 708 based on the charge status. For example, lighting control module 136 may cause the leftmost fifty percent of LEDs within center lamp 706 to illuminate in response to determining that the battery is halfway charged. In another example, lighting control module 136 may control the illumination from front lamp 704 and 708 based on the charge status. For example, as depicted in FIG. 3, when the charge status is twenty five percent, the bottom twenty five percent of front lamp 704 and/or 708 may be illuminated. In some embodiments, front lamp 704 and 708 may comprise high and low beams. In such embodiments, the portion of front lamp 704 and 708, excluding the high and low beams, may illuminate to indicate the charge status.

While the charge indication system of FIG. 7 is discussed in relation to center lamp 706 and front lamp 704 and 710, it would be understood that any exterior lights, such as side lamps 702 and 710 can be used without departing from the scope of this disclosure. In some embodiments, front lamp 704 and 710 may be configured as a headlight of vehicle 120. Center lamp 706 and side lamps 702 and 710 may be configured as positioning lights for vehicle 120.

Figure 8:
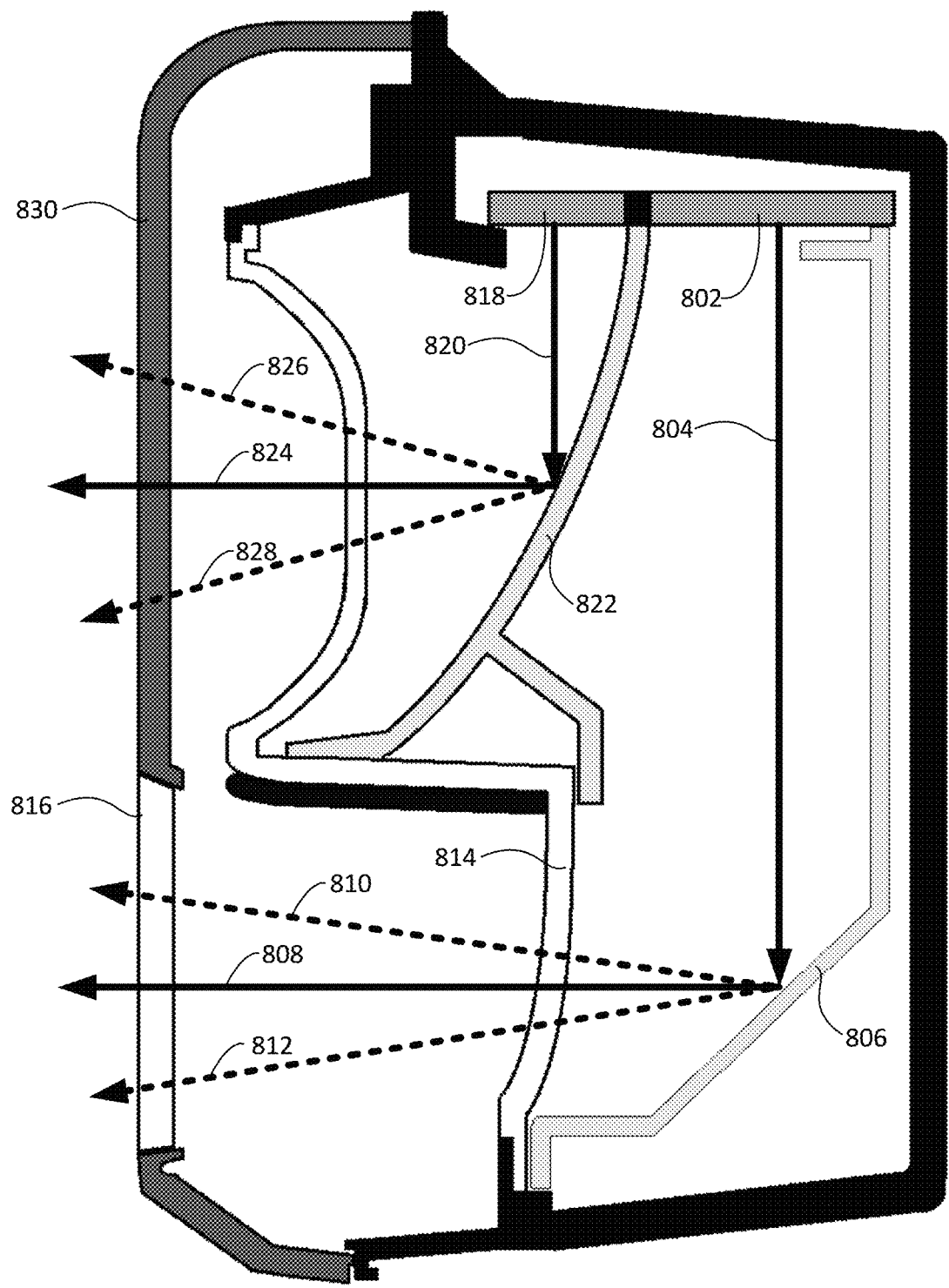
FIG. 8 shows an illustrative cross sectional view of an exterior light of an electric vehicle in accordance with some embodiments of the present disclosure.

FIG. 8 shows an illustrative cross sectional view of an exterior light (e.g., exterior light 800) of an electric vehicle in accordance with some embodiments of the present disclosure. Exterior light 800 is depicted as a single exterior light enclosure having multiple internal reflective surfaces and downward illuminating light sources. Although exterior light 800 comprises multiple illumination sources, exterior light 800 is a single lighting enclosure, such as a taillight. Exterior light 800 is a cross sectional view of an exterior light (e.g., exterior lighting 140), such as a taillight. Exterior light 800 is a single exterior light comprising light source 802 arranged to direct light from source 802 downward and light source 818 arranged to direct light from light source 818 downward. Light sources 802 and 818 may be any suitable light source, such as a LED, an array of LEDs, an incandescent bulb, etc. Incident light 804 from light source 802 may be directed downward toward reflective surface 806. Reflective surface 806 may be arranged at an angle relative to light source 802 such that incident light 804 is reflected in the direction of exterior lens 816. Incident light 820 from light source 818 may be directed downward toward reflective surface 822. Reflective surface 822 may be arranged at an angle relative to light source 818 such that incident light 820 is reflected in the direction of exterior lens 830. The texture of reflective surfaces 806 and 822 may be selected based on a desired light scattering and reflection of incident light 804 and 820, respectively. For example, the texture of reflective surface 806 may be selected such that the reflected light (e.g., specular reflected light 808 and diffuse reflected light 810 and 812) is visible across a surface of exterior lens 816. The texture of reflective surface 822 may be selected such that reflected light (e.g., specular reflected light 824 and diffuse reflected light 826 and 828) is visible across the surface of exterior lens 830. Although exterior lens 830 and 816 are depicted as two separate lenses that are integrated into a single light housing, in some embodiments, exterior lens 830 and 816 may be a single lens integrated into a single light housing. Exterior light 800 may additionally comprise interior lens 814 configured to transmit, focus, or disperse light reflected from reflective surfaces 806 and 822. In some embodiments, exterior light 800 may comprise internal baffles between sections of light source 802. The internal baffles may absorb light emitted from source 802 that is not directed downwards.

In some embodiments, lighting control module 136 my control, during driving operation of the vehicle, light source 818 to emit light indicating a driving state of the vehicle (e.g., for signaling, marking, indicating a braking operation, etc.). In such embodiments, lighting control module 136 may control, during charging operation of the vehicle, light source 802 to emit light indicating a charge state of the vehicle as discussed above. Although light source 802 and light source 818 are depicted as separate light sources, in some embodiments, light source 802 and light source 818 may be a single light source. In such embodiments, the single light source is controlled by lighting control module 136 to indicate both the driving state (e.g., for marking, signaling, indicating braking, etc.) and to indicate the charge state of the vehicle.

Figure 9:
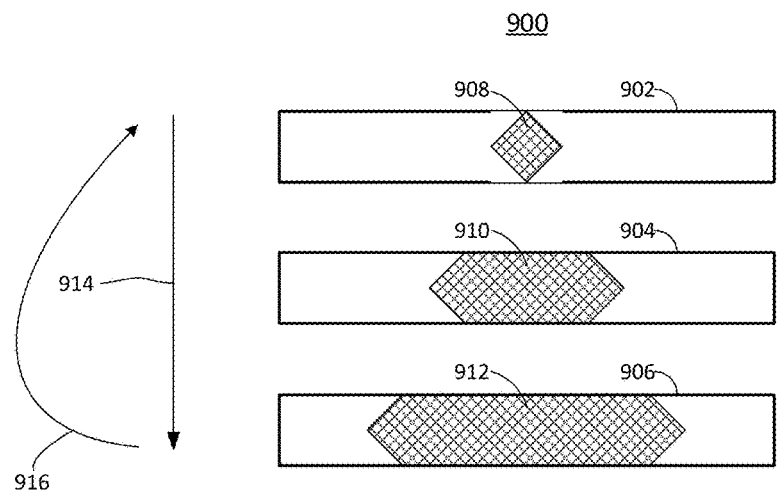
FIG. 9 shows three illustrative views of an exterior light of an electric vehicle indicating an outflow of current from the electric vehicle in accordance with some embodiments of the present disclosure.

FIG. 9 shows three illustrative views of an exterior light of an electric vehicle (e.g., exterior lighting 140) indicating an outflow of current from the electric vehicle in accordance with some embodiments of the present disclosure. For example, when electric vehicle subsystem 130 detects that vehicle 120 is charging another vehicle via vehicle to vehicle charging, lighting control module 136 may animate the exterior light to indicate an outflow of current from battery 122. The exterior light may be any suitable exterior light such as a daytime running light or a position light, (e.g., center lamp 706). Each of the three views (e.g., views 902, 904, and 906) shows a different illumination pattern depicted as various shaded regions (e.g., shaded regions 908, 910, and 912). Axis 914 depicts an increasing passage of time from top to bottom. In view 902, lighting control module 136 illuminates a center portion of the exterior light, depicted as shaded region 908. In view 904, after the passage of an unit of time (e.g., one second), lighting control module 136 increases the size of the illuminated portion of the exterior light, depicted as shaded region 910. In view 906, after the passage of another unit of time (e.g., another second), lighting control module 136 increases the size of the illuminated portion of the exterior light, depicted as shaded region 912. After all of the exterior light is fully illuminated, and after the passage of another unit of time, lighting control module 136 decreases the size of the illuminated portion of the exterior light, depicted as shaded region 908 (e.g., as indicated by cycle return arrow 916). By progressively increasing the size of the illuminated center portion of the exterior light and then repeating the cycle, lighting control module is able to provide an animation that indicates to the user that the vehicle is currently supplying an outflow current to a current sink (e.g., another vehicle that is being charged by vehicle 120). FIG. 9 depicts an exemplary exterior light animation indicating that vehicle 120 is sup- plying current to a current sink. Any exterior light animation may be used without departing from the scope of the present invention so long as it indicates that current is being supplied by vehicle 120. For example, when the exterior light is a circle, the animation may include radially increasing a size of the illuminated portion from a center of the circle. Another exemplary animation may include circular arrow depicted to rotate clockwise over time. Another exemplary animation may include arrows or circles appearing to move outward away from the center of the exterior light.

Figure 10:
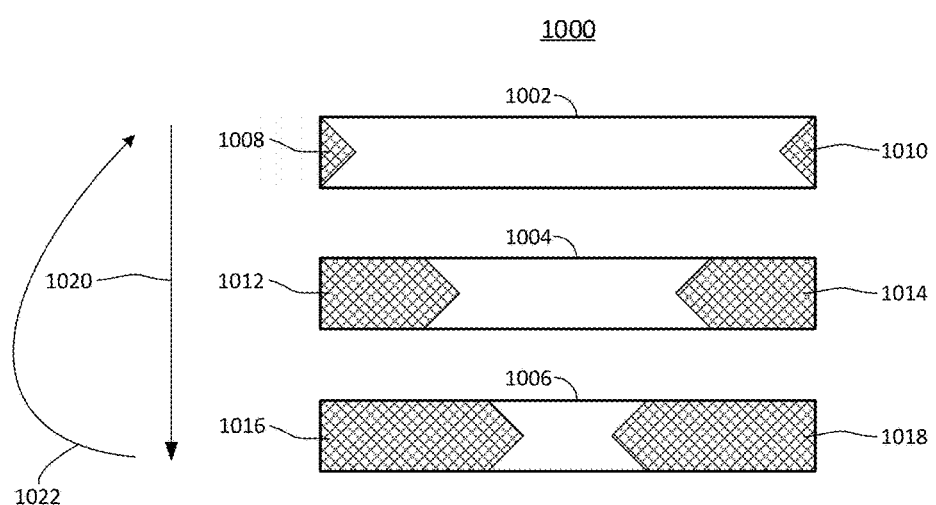
FIG. 10 shows three illustrative views of an exterior light of an electric vehicle indicating an inflow of current to the electric vehicle in accordance with some embodiments of the present disclosure.

FIG. 10 shows three illustrative views of an exterior light of an electric vehicle (e.g., exterior lighting 140) indicating an inflow of current from the electric vehicle in accordance with some embodiments of the present disclosure. For example, when electric vehicle subsystem 130 detects that vehicle 120 is being charged by another vehicle via vehicle to vehicle charging, lighting control module 136 may animate the exterior light to indicate an inflow of current to battery 122. The exterior light may be any suitable exterior light such as a daytime running light or a position light, (e.g., center lamp 706). Each of the three views (e.g., views 1002, 1004, and 1006) shows a different illumination pattern depicted as various shaded regions (e.g., shaded regions 1008, 1010, 1012, 1014, 1016, 1018). Axis 1020 depicts an increasing passage of time from top to bottom. In view 1002, lighting control module 136 illuminates a left and a right portion of the exterior light, depicted as shaded region 1008 and 1010. In view 1004, after the passage of an unit of time (e.g., one second), lighting control module 136 increases the size of the left and right illuminated portion of the exterior light, depicted as shaded regions 1012 and 1014. In view 1006, after the passage of another unit of time (e.g., another second), lighting control module 136 increases the illuminated portion of the exterior light, depicted as shaded regions 1016 and 1018. After all of the exterior light is fully illuminated, and after the passage of another unit of time, lighting control module 136 decreases the size of the illuminated portion of the exterior light, depicted as shaded regions 1008 and 1010 (e.g., as indicated by cycle return arrow 916). By progressively increasing the size of the illuminated portion of the exterior light from an outside perimeter of the exterior light inward and then repeating the cycle, lighting control module is able to provide an animation that indicates to the user that the vehicle is currently receiving a charge from another vehicle. By providing an animation during vehicle to vehicle charging, the user can easily identify which vehicle is charging and which is getting charged. While FIG. 10 depicts an exemplary exterior light animation indicating that vehicle 120 is charging, any exterior light animation may be used without departing from the scope of the present invention so long as it indicates that current is being supplied to vehicle 120. For example, when the exterior light is a circle, the animation may include radially increasing a size of the illuminated portion from a perimeter of the circle into the center of the circle. Another exemplary animation may include circular arrow depicted to rotate clockwise over time. Another exemplary animation may include arrows or circles appearing to move toward the center of the exterior light.

While the animations are depicted in FIGS. 9 and 10 as discrete animations, the unit of time and increase in size of the illuminated region may be may be selected such that the change appears as continuous to the user. In some embodiments, the animations depicted in FIGS. 9 and 10 may be used in combination with the charge indicators depicted in FIGS. 2 and 3, and/or may be used in combination with intensity variations depicted in FIGS. 4-6 (e.g., using a same or a different light source of the exterior light and/or multiple exterior lights).

Figure 11:
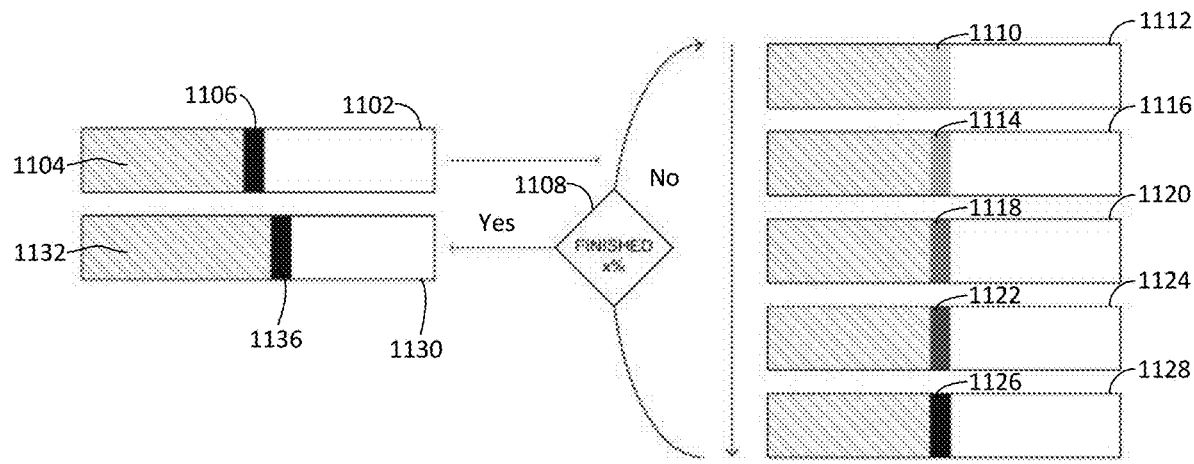
FIG. 11 shows illustrative views of an exterior light of an electric vehicle indicating charge status in accordance with some embodiments of the present disclosure.

FIG. 11 shows illustrative views of an exterior light of an electric vehicle indicating charge status in accordance with some embodiments of the present disclosure. In the exemplary embodiment of FIG. 11, lighting control module 136 varies an intensity of a portion of the exterior light based on the charge status. The exemplary exterior light (e.g., one of exterior lighting 140) may comprise a plurality of independently controllable illuminating elements, such as a plurality of LEDs. For example, the exterior light may comprise fifty light sources which can be controlled independently by lighting control module 136. In such embodiments, lighting control module 136 may determine a percentage of battery charge corresponding to each light source. For example, lighting control module 136 may determine that the leftmost light source corresponds to zero through two percent state of charge for battery 122, the second leftmost light source corresponds to two through four percent state of charge, etc., Each light source may correspond to a specific percentage state of charge for the battery (e.g., two percent). Accordingly, lighting control module 136 may control a subset of the plurality of light sources to indicate a charge status (e.g., twenty five light sources when the battery is fifty percent charged). In some embodiments, lighting control module 136 may vary over time the intensity of light emitted from a source that corresponds to the percentage that is presently being charged (e.g., from minimum intensity to maximum intensity). For example, the intensity of light emitted from the twenty sixth leftmost light source may vary over time while the battery is between fifty through fifty two percent charged. When the battery charge percentage exceeds fifty two percent, the twenty sixth leftmost light source may illuminate at a constant intensity and the intensity of the twenty seventh light source will vary over time.

In each of the views in FIG. 11 (e.g., view 1102, 1112, 1116, 1120, 1124, 1128 and 1130) a color and shading of each region represents a different light intensity. When the battery is charged approximately fifty one percent, lighting control module 136 may illuminate the leftmost twenty five light sources (e.g., constant intensity region 1104) at a constant intensity (e.g., signal 402 depicted in FIG. 4) and may vary over time the intensity of the twenty sixth light source (e.g., charging region 1106).

At decision 1108, lighting control module 136 determines whether a battery charge has exceeded a percentage corresponding to charging region 1106. For example, lighting control module 136 may determine that charging region 1106 corresponds to a battery charge percentage between fifty and fifty two. While the battery is fifty one percent charged, lighting control module will progressively increase the intensity of light emitted from charging region 1106. For example, views 1112, 1116, 1120, 1124, and 1128 depict a progressively increasing intensity emitted from charging regions 1110, 1114, 1118, 1122, and 1126. In view 1112, charging region 1110 is depicted having a ten percent intensity (e.g., ten percent of the maximum intensity); in view 1116 charging region 1114 is depicted having a thirty percent intensity; in view 1120 charging region 1118 is depicted having a fifty percent intensity; in view 1124 charging region 1122 is depicted having a seventy percent intensity; and in view 1128 charging region 1126 is depicted having a ninety percent intensity. When lighting control module 136 determines that the battery charge has not exceeded the percentage corresponding to the charging region (e.g., the battery charge is between fifty and fifty two percent), lighting control module 136 will resume varying over time the intensity of light emitted from the charging region. When lighting control module 136 determines that the battery charge has exceeded the percentage corresponding to charging region 1106 (e.g., the battery charge is greater than fifty two percent), lighting control module 136 will illuminate charging region 1106 at a constant intensity (represented as constant intensity region 1132) and will begin varying the intensity of light emitted from new charging region 1136 (e.g., the region corresponding to fifty two to fifty four percent battery charge).

Although the variation in the light intensity is described as linear, any variation in the signal intensity over time may be used. For example, the intensity of the light may vary as depicted by signal 502 of FIG. 5 or signal 602 of FIG. 6. Although the exterior light depicted in FIG. 11 is rectangular, the exterior light can be any shape and configuration, such as the round, as depicted in FIG. 3, or rectangular as depicted in FIG. 2. While the changes in intensity are depicted in FIG. 11 are discrete, the unit of time and increase in illumination may be may be selected such that the change appears as continuous to the user. In some embodiments, the changes in intensity depicted in FIG. 11 may be used in combination with the charge indicators depicted in FIGS. 2 and 3, and/or may be used in combination with intensity variations depicted in FIGS. 4-6 (e.g., using a same or a different light source of the exterior light and/or multiple exterior lights).

Figure 12:
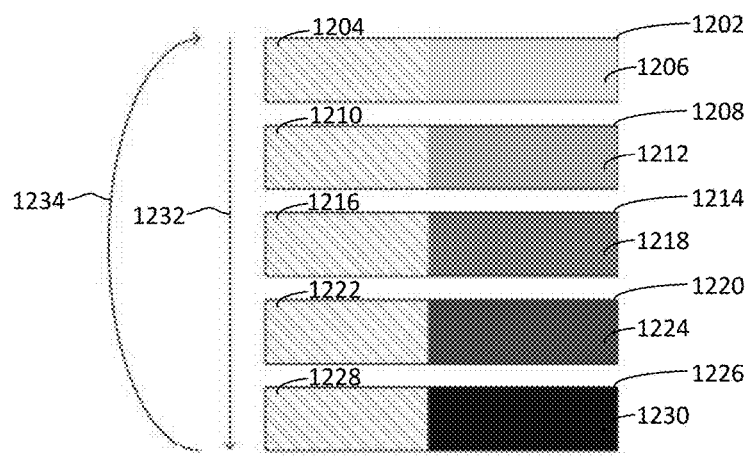
FIG. 12 shows illustrative views of an exterior light of an electric vehicle indicating a charging delay in accordance with some embodiments of the present disclosure.

FIG. 12 shows illustrative views of an exterior light of an electric vehicle indicating a charging delay in accordance with some embodiments of the present disclosure. In some embodiments, lighting control module 136 may receive an indication of a battery charging delay. For example, on-board charger 134 may receive a request from a user to delay charging of battery 122 for five hours even though battery 122 is connected to battery charger 110 (e.g., so that charging takes place when electricity prices are lowest). In response to determining that there is a charging delay (e.g., via on-board charger 134), lighting control module 136 may vary an intensity of a portion of exterior lighting 140 representing an uncharged percentage of the battery. For example, when the battery is charged fifty percent, and there is a charging delay, lighting control module 136 may vary an intensity of the rightmost fifty percent of the exterior light and may illuminate the leftmost fifty percent of the exterior light at a constant intensity. As such, a user can easily determine, from the exterior of the vehicle, a current battery charge level and that the battery will begin charging in the future.

Each of the five illustrative views depicted in FIG. 12 (e.g., view 1202, 1208, 1214, 1220, and 1226) shows a different intensity of an exterior light depicted as various varying intensity regions (e.g., 1206, 1212, 1218, 1224, and 1230) and various constant intensity regions (e.g., 1204, 1210, 1216, 1222, and 1228). The constant intensity regions 1204, 1210, 1216, 1222 and 1228 may illuminate at a substantially constant intensity in each view (e.g., seventy percent of a maximum intensity). In view 1202, the right portion of the exterior light is emitting light at a low intensity (e.g., ten percent of maximum intensity). After a period of time (e.g., 0.5 seconds represented by time bar 1232), lighting control module 136 increases the intensity of light emitted from the right portion (e.g., thirty percent of maximum intensity), depicted as varying intensity region 1212. After passage of the period of time (e.g., an additional 0.5 seconds represented by time bar 1232), lighting control module 136 increases the intensity of light emitted from the right portion (e.g., fifty percent of maximum intensity), depicted as varying intensity region 1218. After passage of the period of time (e.g., an additional 0.5 seconds), lighting control module 136 increases the intensity of light emitted from the right portion (e.g., seventy percent of maximum intensity), depicted as varying intensity region 1224. After passage of the period of time (e.g., an additional 0.5 seconds), lighting control module 136 increases the intensity of light emitted from the right portion (e.g., ninety percent of maximum intensity), depicted as varying intensity region 1230. After passage of the period of time, the cycle repeats, represented by arrow 1234.

Although the change in intensity is depicted as linearly increasing and then repeating, any variation in intensity can be used (e.g., the changes in intensity represented by signal 502 or 602). Although the exterior light depicted in FIG. 12 is rectangular, the exterior light can be any shape and configuration, such as the round, as depicted in FIG. 3, or rectangular as depicted in FIG. 2. While the changes in intensity are depicted in FIG. 12 are discrete, the period of time and increase in illumination may be may be selected such that the change appears as continuous to the user. In some embodiments, the changes in intensity depicted in FIG. 12 may be used in combination with the charge indicators depicted in FIGS. 2 and 3, and/or may be used in combination with intensity variations depicted in FIGS. 4-6 (e.g., using a same or a different light source of the exterior light and/or multiple exterior lights).

In some embodiments, lighting control module 136 causes the exterior light to emit light for the entirety of the duration of the charging delay. For example, when the charging is delayed for five hours, the exterior light emits light in accordance with the embodiment of FIG. 12 for five hours. In some embodiments, the charging delay indicator depicted in FIG. 12 is displayed only during the presence of a user. For example, when lighting control module 136 receives data from sensors 145 indicating the presence of a person, lighting control module 136 can cause exterior lighting 140 to emit light that indicates the charge delay. In some embodiments control module 136 will cause exterior lighting 140 to cease emitting light that indicates the charge delay, after a threshold amount of time (e.g., five minutes) from detecting the presence of a person. In some embodiments, the charging delay indicator is displayed when the vehicle is in specific locations. For example, in some embodiments, lighting control module determines whether vehicle 120 is located at a tagged location (e.g., based on GPS data from sensors 145) and displays the charge delay indicator when the vehicle is within a threshold distance of a tagged location. In some embodiments, the charge delay indicator of FIG. 12 is displayed for a threshold amount of time after plugging in battery charger 110 to vehicle 120. For example, the charge delay indicator may be displayed for five minutes after plugging in charger 110 to vehicle 120. The charge delay indicator may be displayed once again upon detecting the presence of a user. In some embodiments, after the charge delay is completed and the battery begins charging, a charge status indicator as discussed above is displayed instead of the charge delay indicator.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A charge indicator system for an electric vehicle, comprising:
   an exterior light;
   a battery management module;
   a lighting control module communicatively coupled to the battery management module, wherein the lighting control module is configured to:
      cause the exterior light to emit light during driving operation of the electric vehicle;
      receive charge status information of a vehicle battery from the battery management module;
      cause the exterior light to emit light that indicates charge status based on the received charge status information;
      determine, based on the charge status information, that the electric vehicle is charging; and
      based on the determining:
         illuminate a first region of the exterior light and a second region of the exterior light;
         move the illuminated first region and the illuminated second region inward towards each other from initial positions; and
         return the illuminated first region and the illuminated second region to their initial positions.

2. The system of claim 1, wherein the lighting control module is configured to cause the exterior light to:
   emit light at a substantially constant intensity during operation of the electric vehicle; and
   emit light at a varying intensity during charging.

3. The system of claim 2, wherein the lighting control module is configured to cause the exterior light to emit light at a rapidly varying intensity when the charge status information indicates a charging fault has occurred.

4. The system of claim 2, wherein the light emitted during operation and during charging is the same color.

5. The system of claim 1, wherein the exterior light comprises a width and a height and wherein the width is at least five times greater than the height.

6. The system of claim 1, wherein the lighting control module is configured to cause the exterior light to:
   emit light of a first color during operation of the electric vehicle; and
   emit light of a second color during charging, wherein the first color is different than the second color.

7. The system of claim 6, wherein the second color comprises blue.

8. The system of claim 6, wherein the lighting control module is configured to cause the exterior light to emit light of a third color when the vehicle battery is fully charged.

9. The system of claim 8, wherein the third color comprises green.

10. The system of claim 6, wherein the lighting control module is configured to cause the exterior light to emit light of a fourth color when there is a charging fault.

11. The system of claim 10, wherein the fourth color comprises red.

12. The system of claim 1, further comprising a proximity sensor configured to detect a presence of a person, wherein:
   the lighting control module is configured to:
      receive a signal from the proximity sensor indicating the presence of the person; and cause the exterior light to emit light that indicates charge status responsive to the signal indicating the presence of a person.

13. The system of claim 12, wherein the proximity sensor comprises a motion sensor configured to detect motion and wherein the signal indicating the presence of the person comprises a signal indicating the presence of motion.

14. The system of claim 12, wherein the proximity sensor comprises one of a near-field communication device and a Bluetooth communication device.

15. The system of claim 1, further comprising a positioning device configured to determine a location of the electric vehicle, wherein:
the lighting control module is configured to:
receive a signal from the positioning device indicating the location of the electric vehicle; and
cause the exterior light to emit light that indicates charge status responsive to the location of the electric vehicle.

16. The system of claim 15, wherein the lighting control module is configured to cause the exterior light to emit light that indicates charge status when the location of the electric vehicle is not within a threshold distance of a tagged location.

17. The system of claim 15, wherein the lighting control module is configured to cause the exterior light to not emit light that indicates charge status when both the electric vehicle is charging and the location of the electric vehicle is within a threshold distance of a tagged location.

18. The system of claim 1, wherein the exterior light comprises:
a first set of light emitting diodes (LEDs) for emitting light during operation of the electric vehicle; and
a second set of LEDs for emitting light that indicates the charge status.

19. The system of claim 18, wherein the lighting control module is configured to:
cause a first subset of the second set of LEDs to emit light to indicate a first charge status; and
cause a second subset of the second set of LEDs to emit light to indicate a second charge status.

20. A method for indicating charge status of an electric vehicle, comprising:
emitting light of a substantially constant light intensity, using an exterior light, during driving operation of the electric vehicle;
receiving charge status information of a vehicle battery from a battery management module;
emitting light, using the exterior light, that indicates charge status of the based on the received charge status information;
determining, based on the charge status information, that the electric vehicle is charging; and
based on the determining:
illuminating a first region of the exterior light and a second region of the exterior light;
moving the illuminated first region and the illuminated second region inward towards each other from initial positions; and
returning the illuminated first region and the illuminated second region to their initial positions.

* * * * *